Patented Oct. 30, 1951

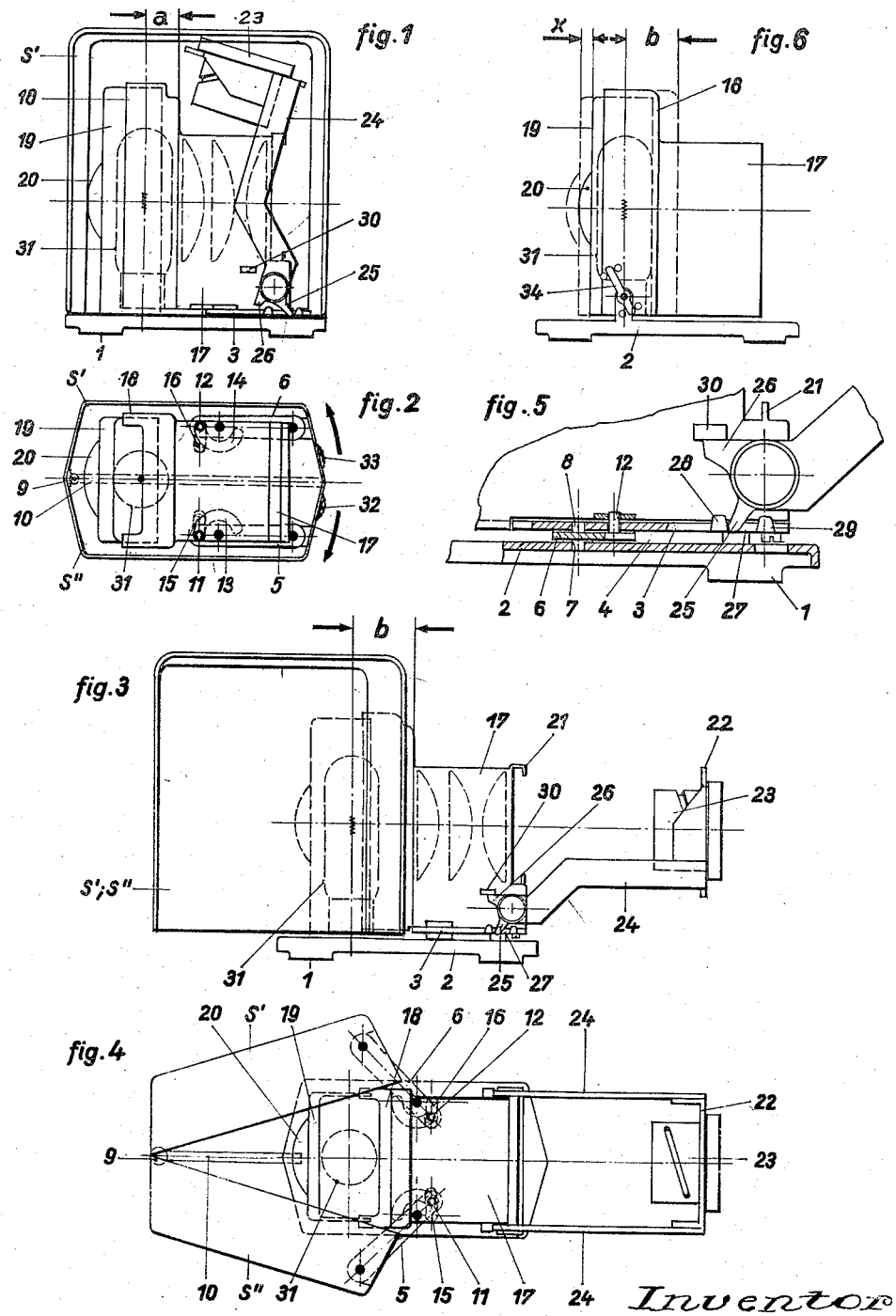

2,573,088

UNITED STATES PATENT OFFICE 2,573,088

PROJECTOR PROVIDED WITH PROTECTING CASING

Erich Zillmer, Braunschweig-Querum, Germany

Application March 18, 1949, Serial No. 82,141
In Germany October 1, 1948

7 Claims. (Cl. 88—24)

This invention relates to projectors and is particularly directed to an apparatus of this type which is attached to and enclosed in a protecting casing and whose optical and operating parts can either be readily drawn out of that casing for immediate action or pushed back into it without difficulty after the work has been done, whereby the protecting casing remains attached to the apparatus, regardless of whether the latter is in condition of work or in condition of rest. It merely changes its position with respect to the apparatus is such a way that it completely encloses the apparatus when the latter is pushed into it with its operating parts closely together, but only surrounds the lamp-chamber when the apparatus is ready for action.

The latter feature is an important advantage in that it protects the operator of the device against painful burns resulting from contact with the lamp-casing, which in small apparatus like this is necessarily of a very small size and for that reason subject to strong overheating.

A further advantage of the invention results from the fact that the apparatus has been provided with a special type of supporting-frame for the objective which simultaneously serves as an actuating means for the closing and opening mechanism of the construction in such a way that downward or upward turning of the supporting-frame automatically transfers the apparatus from its position of rest within the casing to its position of work outside the casing and vice versa.

Another advantage of the invention resides in the feature that the apparatus is provided with means, which are coupled to the closing and opening mechanism of the construction, and which automatically reduce the size of the apparatus to a minimum when it is moved into its position of rest within the casing, and automatically restore the apparatus to properly spaced condition when it is moved into its position of work outside the casing.

In order to reduce the apparatus to a minimum of size when moved into its position of rest the condenser or reflector or both of them are so arranged in the apparatus that they are displaced in the direction of the optical axis towards the lamp by the closing-movement, and away from the lamp by the opening-movement.

It will be seen, therefore, that the invention discloses a device in which all of the movements of the apparatus into and out of the protecting casing, and of the reflector and condenser towards and away from the lamp, are automatically caused and controlled in a simple, reliable and effective way by the upward and downward movement of the objective-carrier.

Additional advantages and features of the invention may be understood from the following detailed description taken in connection with the accompanying drawings, forming a part of the specification, and in which similar reference numerals indicate like parts in the different figures. However, it is to be understood that the invention is not confined to any strict conformity with the drawings, but may be changed or modified, so long as such changes or modifications mark no material departure from the salient features of the invention as expressed in the appending claims.

In the drawings:

Fig. 1 is a side-elevation of the projector when not in working condition, with parts of the protecting casing broken away;

Fig. 2 is a top-view of the projector illustrated in Fig. 1;

Fig. 3 is a side-elevation of the projector of Fig. 1 when pulled out of the protecting-casing and ready for action;

Fig. 4 is a top-view of the projector of Fig. 3;

Fig. 5 is a side-elevation of a detail, showing the guiding-means on an enlarged scale, partly in section;

Fig. 6 is a detail-view of a modification, showing how the reflector may be moved closer to the lamp to further reduce the volume of the apparatus.

Referring now to the drawings in detail the base of the projector is formed by a base-plate 2 provided with feet 1. Mounted on the base-plate 2 is a guide-plate 3. Rotatably mounted in space 4 between the base-plate 2 and the guide-plate 3 are two actuating-members 5 and 6, each of them being pivoted by a pivot 7 to the base-plate 2 and by a pivot 8 to the guide-plate 3 (see Fig. 5).

The actuating-members 5 and 6 have been devised to form two-armed levers having their longer arms pivoted to the ends of the covering-members S' and S'' of a protecting casing, while the opposite ends of the two covering-members are linked together like the shells of an oyster and pivotally mounted on a slide-bar 10 adapted for sliding displacement in the direction of the optical axis.

The shorter arms of the actuating members 5 and 6 move and are guided between the base-plate 2 and the guide-plate 3 and are equipped at their free ends with vertical pins 11 and 12 which project through slots 13 and 14 of arch-shaped formation provided in the guide-plate 3 slightly above the latter and engage in longitudinal slots 15 and 16 provided in the bottom of the condenser transversely of the optical axis of the apparatus. The condenser 17 is displaceably mounted on the guide-plate 3 in laps or in a longitudinal slot in such a way that it can be shifted forward and backward in the direction of the optical axis in synchronized cooperation with the opening and closing action of the actuating members 5 and 6 which control and effect the opening and closing movements of the covering-members S' and S''.

As illustrated in the drawings the lamp-chamber consists of two parts 18 and 19 and the construction may be so devised that part 18 of the chamber is attached to the condenser 17 while the other part 19 of the chamber, which carries the reflector 20, is secured to the base-plate 2.

The condenser 17 is further provided with a U-shaped holding frame for the objective, consisting of the two shanks 24 and the holder 22 for the adjustable objective 23. The U-shaped holding-frame is tiltably mounted directly beneath lap 21 for the introduction of the diapositive cassettes, and the shanks 24 of the holding-frame are equipped laterally of their pivoting points with a finger 25 and a nose 26 in such a way that the forward and backward rotation of the finger 25 through the space 27 is limited by the projections 28 and 29 provided on the indisplaceably mounted guide-plate 3, whereby the projections 28 and 29 may be punched out of the guide-plate and be integral with the latter.

When the apparatus is in working condition, as illustrated in Fig. 3, the noses 26 of the frame 24 bear against stops 30 provided at the condenser-casing 17, whereupon the correct position of the objective 23 in the optical axis of the apparatus is assured.

The correct optical distance of the condenser 17 from the center of the lamp 31 has been marked "b" in Fig. 3.

In order to transform the apparatus from its condition of work, illustrated in Figs. 3 and 4, to its condition of rest, shown in Figs. 1 and 2, the frame 22, 24 carrying the objective 23 is tilted upward from the position illustrated in Fig. 3 to the position shown in Fig. 1. When this is being done the condenser 17 is forced forward, by means of the finger 25 bearing against the projections 29, to such an extent that the distance between the condenser and the center of the lamp is reduced from "b" to "a" (see Fig. 1).

When the condenser is moving towards the lamp the pins 11 and 12, projecting through the arch-shaped guide-ways 13 and 14 into the longitudinal slots 15 and 16 of the condenser, are forced by the forward movement of the condenser along the arch-shaped guide-ways and thus effect the closing movement of the protecting casing, whereby the covering-members S' and S'' are pulled over the apparatus as illustrated in Fig. 2 of the drawings.

In order to get the apparatus ready for action the two covering members S' and S'' are separated from each other by means of pressure exerted against the buttons 32, 33 (in the direction indicated by the arrows of Fig. 2) to such an extent that the frame 22, 24 can be seized and pulled into the position illustrated in Fig. 3, whereby the covering members are automatically forced backward into the position shown in Figs. 3 and 4 in which they embrace protectingly only the lamp-chamber 18, 19.

A further reduction in volume of the apparatus when not in operation can be achieved if the reflector 20 is likewise displaced from its optical position and moved closer to the lamp, as indicated at $x$ of Fig. 6. To obtain this result part 19 of the lamp-chamber, which carries the reflector 20, may be provided with means which make it displaceable in the direction of the optical axis and which couple it to the movement of the displaceable condenser-casing 17, as indicated at 34 of Fig. 6, in such a way that movement of the condenser-casing will automatically cause part 19 of the lamp-chamber to move in the opposite direction, at either an increased or decreased rate.

What I claim is:

1. In a projector provided with a protecting casing, the combination of a projector, consisting essentially of a reflector, a lamp, a condenser and an objective carrier arranged in properly spaced relation behind one another in the direction of the optical axis of said projector, said condenser being provided with plate carrying means and adapted to be displaced toward and away from said lamp in the direction of said optical axis, and said objective-carrier being tiltably mounted at said condenser and adapted to be turned upward and downward toward and away from said condenser; a protecting casing consisting of two shell-like covering members having one of their ends suitably linked together for cooperating closing and opening movement and having their other free ends coupled to said projector, said covering members being adapted to surround all of said elements of said projector when closed together and only said reflector and said lamp when opened up; and actuating means combined with said projector and coupled to said covering members of said protecting casing and adapted to shift said condenser toward said lamp and slide said shell-like members to surround all of said elements of said projector, and slide said shell-like members in opposite directions to free said projector for work and return said condenser to properly spaced relation with said lamp, said actuating means being coupled to said tiltable objective-carrier in such a way that upward-turning of said objective-carrier automatically shifts said condenser toward said lamp and moves said protecting casing to surround said projector, while downward-turning of said objective-carrier automatically draws said protecting casing rearwardly to open position and returns said condenser to properly spaced relation with said lamp.

2. A projector provided with a protecting casing as specified in claim 1, in which said condenser and said reflector are displaceably mounted on both sides of said lamp and coupled to said actuating means of said projector in such a way that upward-turning of said objective-carrier automatically shifts them toward said lamp, and downward-turning of said objective-carrier automatically returns them to properly spaced relation with said lamp.

3. A projector provided with a protecting casing as specified in claim 1, in which said actuating means are provided with two cooperating actuating members whose ends are coupled to said free ends of said shell-like covering members of said protecting casing in such a way that upward-turning of said objective-carrier automatically closes said covering members, and downward-turning of said objective-carrier automatically opens said covering members.

4. A projector provided with a protecting casing as specified in claim 1, in which said projector is mounted on a base provided with two upwardly projecting stop-members, and in which said tiltably mounted objective-carrier is provided with a downwardly extending extension adapted to engage between said stop-members of said base in such a way that upward-turning of said tiltable objective-carrier automatically moves said displaceable condenser toward said lamp, and downward-turning of said tiltable objective-carrier automatically moves said displaceable condenser away from said lamp.

5. A projector provided with a protecting casing as specified in claim 1, in which said condenser is provided in its bottom with slots extending transversely of said optical axis of said projector, and in which said actuating means are provided with two cooperating actuating members consisting of two rotatably mounted two-armed levers whose longer arms are coupled to said free ends of said shell-like covering members of said protecting casing, and whose shorter arms are provided with vertically disposed pins extending upwardly into said slots of said condenser.

6. In a projector having a lamp enclosed by a housing, a fixed base plate mounting said lamp, a protecting casing comprised by two hinged shell-like covering members adapted to enclose said projector, said protecting casing being mounted for slidable movement on said fixed base plate along the optical axis of said projector forwardly into normal closed position, an objective lens holder pivotally mounted and adapted to be swung upwardly into normal position when not in use and downwardly into operative position, said objective lens holder being connected to the shell-like members of said protective casing in such manner that as the objective lens holder is swung downwardly into the operative position said protecting casing is opened and displaced rearwardly to such an extent that only the lamp housing of said projector is still enclosed by said protecting casing, while, as said objective lens holder is swung upwardly into normal position, said protecting casing is displaced forwardly and closed over said projector and the objective lens holder.

7. In a projector having a lamp enclosed by a housing, a fixed base plate mounting said lamp, a guide plate over said fixed base plate, a protecting casing comprised by two hinged shell-like covering members adapted to enclose said projector, said protecting casing being mounted for slidable movement on said fixed base plate along the optical axis of said projector forwardly into normal closed position and rearwardly into open position, an objective lens holder, a pivoted arm mounting said objective lens holder for swinging movement upwardly into normal position when not in use and downwardly into operative position, linkage interconnecting said pivoted lens holder and said guide plate for reciprocating the latter in accordance with swinging movements of the former, levers positioned between the base and guide plates and pivoted to the former and to the shell-like members of the protective casing, said guide plates having arcuate slots therein, pins on said levers each projecting into an arcuate slot in the guide plate, whereby as the objective lens holder is swung downwardly into the operative position said protecting casing is opened and displaced rearwardly to such an extent that only the lamp housing is still enclosed by the latter, while, as said objective lens holder is swung upwardly into normal position, said protecting casing is displaced forwardly and closed over said projector and the objective lens holder.

ERICH ZILLMER.

REFERENCES CITED

The following references are of record in the file of this patent:

UNITED STATES PATENTS

| Number | Name | Date |
|---|---|---|
| 1,779,635 | Newman | Oct. 28, 1930 |
| 1,939,561 | Martin | Dec. 12, 1933 |
| 2,070,226 | Erwood | Feb. 9, 1937 |
| 2,121,910 | Freimann | June 28, 1938 |
| 2,139,152 | Freimann | Dec. 6, 1938 |
| 2,221,160 | Worthington et al. | Nov. 12, 1940 |
| 2,450,757 | Hutchison | Oct. 5, 1948 |